(12) United States Patent
Gebhard

(10) Patent No.: US 11,585,239 B2
(45) Date of Patent: Feb. 21, 2023

(54) MULTI-FUNCTION OIL TANK

(71) Applicant: Rolls-Royce Corporation, Indianapolis, IN (US)

(72) Inventor: John Gebhard, Fishers, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 863 days.

(21) Appl. No.: 16/281,852

(22) Filed: Feb. 21, 2019

(65) Prior Publication Data
US 2020/0271014 A1    Aug. 27, 2020

(51) Int. Cl.
| | | |
|---|---|---|
| *F01D 25/18* | (2006.01) | |
| *F01M 5/00* | (2006.01) | |
| *F01M 11/00* | (2006.01) | |
| *F01M 11/08* | (2006.01) | |
| *F16N 39/00* | (2006.01) | |
| *F16N 39/02* | (2006.01) | |
| *F01M 1/10* | (2006.01) | |

(52) U.S. Cl.
CPC .............. *F01D 25/18* (2013.01); *F01M 1/10* (2013.01); *F01M 5/002* (2013.01); *F01M 5/005* (2013.01); *F01M 11/0004* (2013.01); *F01M 11/08* (2013.01); *F16N 39/002* (2013.01); *F16N 39/02* (2013.01); *F01M 2011/0025* (2013.01)

(58) Field of Classification Search
CPC ........ F01M 5/002; F01M 5/005; F01M 11/08; F01M 2011/0025; F16N 19/003; F16N 39/002; F16N 39/02
See application file for complete search history.

(56) References Cited

U.S. PATENT DOCUMENTS

| | | | | |
|---|---|---|---|---|
| 810,844 | A * | 1/1906 | Crawford | F16N 39/02 |
| | | | | 184/104.1 |
| 1,607,987 | A * | 11/1926 | Kagi | F25B 1/04 |
| | | | | 62/470 |
| 2,021,129 | A * | 11/1935 | Chilton | F01M 5/002 |
| | | | | 123/196 AB |
| 2,450,960 | A * | 10/1948 | Heintz | F01P 11/08 |
| | | | | 184/104.1 |

(Continued)

FOREIGN PATENT DOCUMENTS

| | | |
|---|---|---|
| CN | 107762634 | 3/2018 |
| RU | 2578784 | 3/2016 |

*Primary Examiner* — Minh Truong
(74) *Attorney, Agent, or Firm* — Crowell & Moring LLP

(57) ABSTRACT

An oil distribution system uses an oil storage container to contain an air/oil separation unit, a heat exchanger, and an oil reservoir. The functions of oil storage, air/oil separation, and cooling are integrated in the container. Hot aerated oil enters the container at an air/oil separation unit. The air/oil separator deposits hot de-aerated oil into the oil reservoir. The oil reservoir transfers hot de-aerated oil to conduits in a heat exchanger. The heat exchanger uses fuel to cool the oil and warm the fuel. Cooled de-aerated oil is provided to a mechanical device for lubrication and warmed fuel is provided to power an engine. The container may alternatively receive hot aerated oil into the conduits in the heat exchanger. Cooled aerated oil is delivered to the air/oil separation unit to deposit cooled de-aerated oil into the reservoir. Cooled de-aerated oil is pumped to a mechanical device to provide lubrication.

20 Claims, 6 Drawing Sheets

(56) References Cited

U.S. PATENT DOCUMENTS

| | | | | |
|---|---|---|---|---|
| 3,116,134 | A * | 12/1963 | May | F01D 25/20 165/145 |
| 3,876,401 | A * | 4/1975 | Sturgill | F04B 39/16 55/481 |
| 5,535,711 | A * | 7/1996 | Kach | F01M 5/021 123/196 AB |
| 6,348,087 | B1 | 2/2002 | Aslin | |
| 6,463,819 | B1 | 10/2002 | Rago | |
| 6,502,630 | B1 | 1/2003 | MacFarlane et al. | |
| 6,958,107 | B1 * | 10/2005 | Clarke | B04C 5/06 202/175 |
| 7,377,098 | B2 | 5/2008 | Walker et al. | |
| 7,806,740 | B1 * | 10/2010 | Taylor | F01P 3/202 123/41.1 |
| 10,843,112 | B2 * | 11/2020 | Sugio | B01D 45/08 |
| 2010/0212867 | A1 * | 8/2010 | Hollweck | F01M 11/0004 165/104.19 |
| 2015/0151231 | A1 | 6/2015 | Loh et al. | |
| 2016/0076491 | A1 * | 3/2016 | Wilson | F02M 25/089 96/216 |

\* cited by examiner

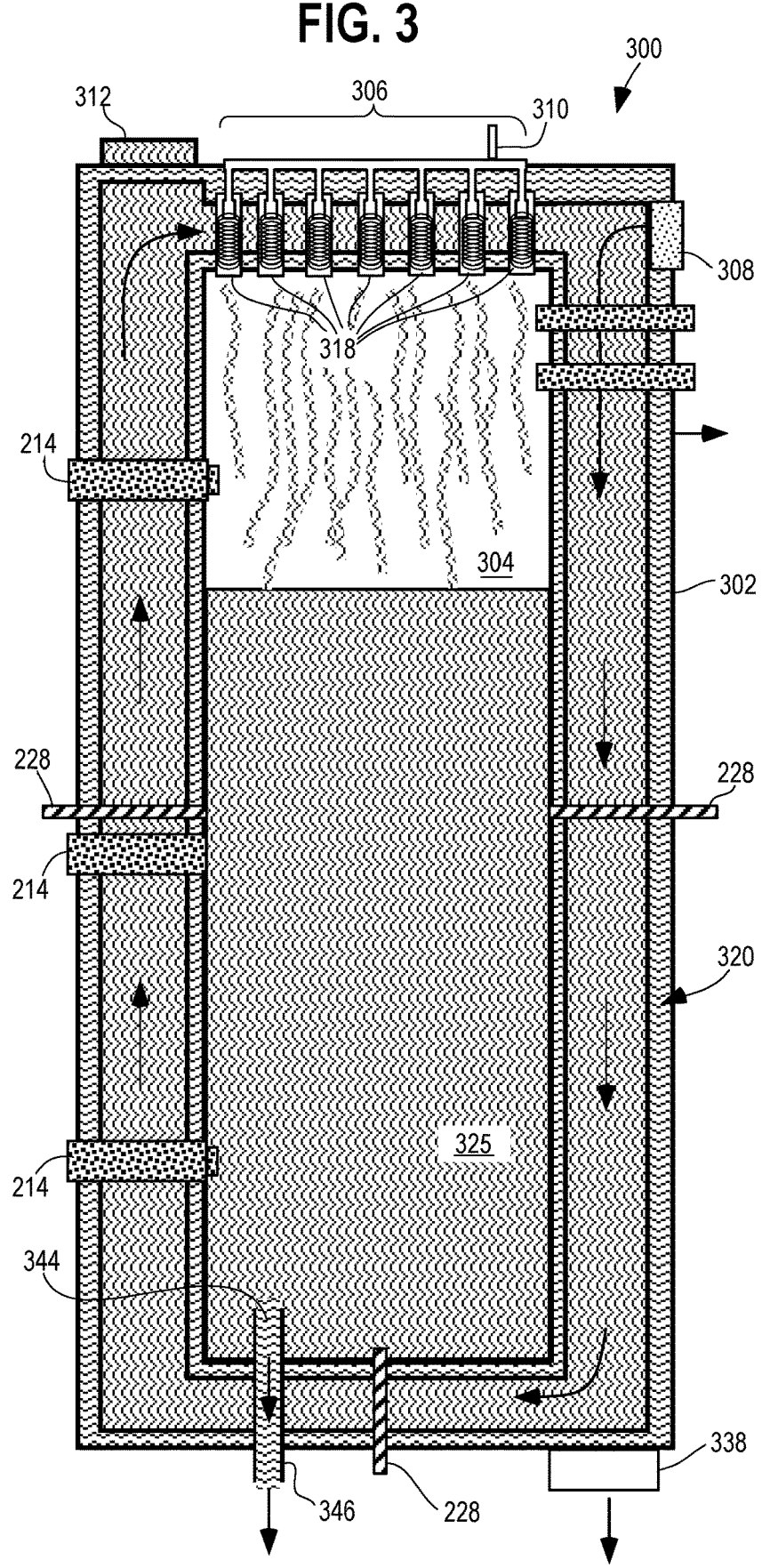

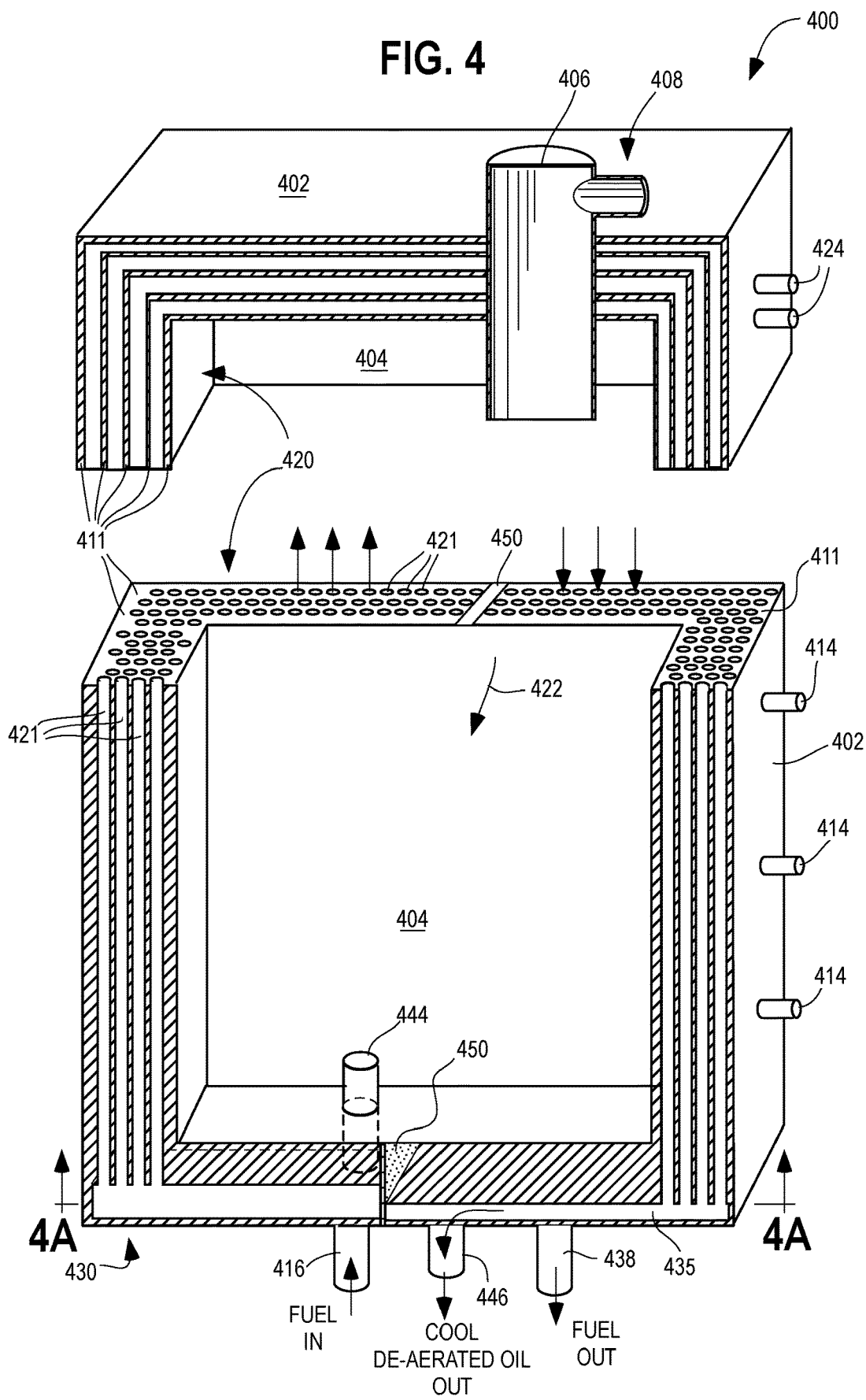

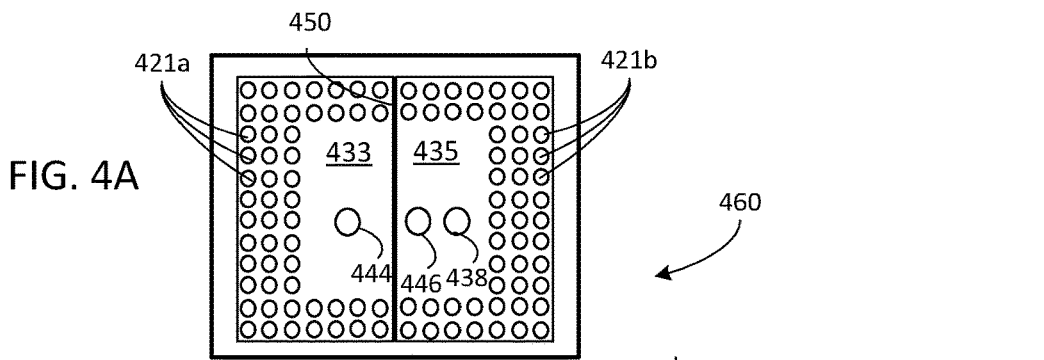
FIG. 4A
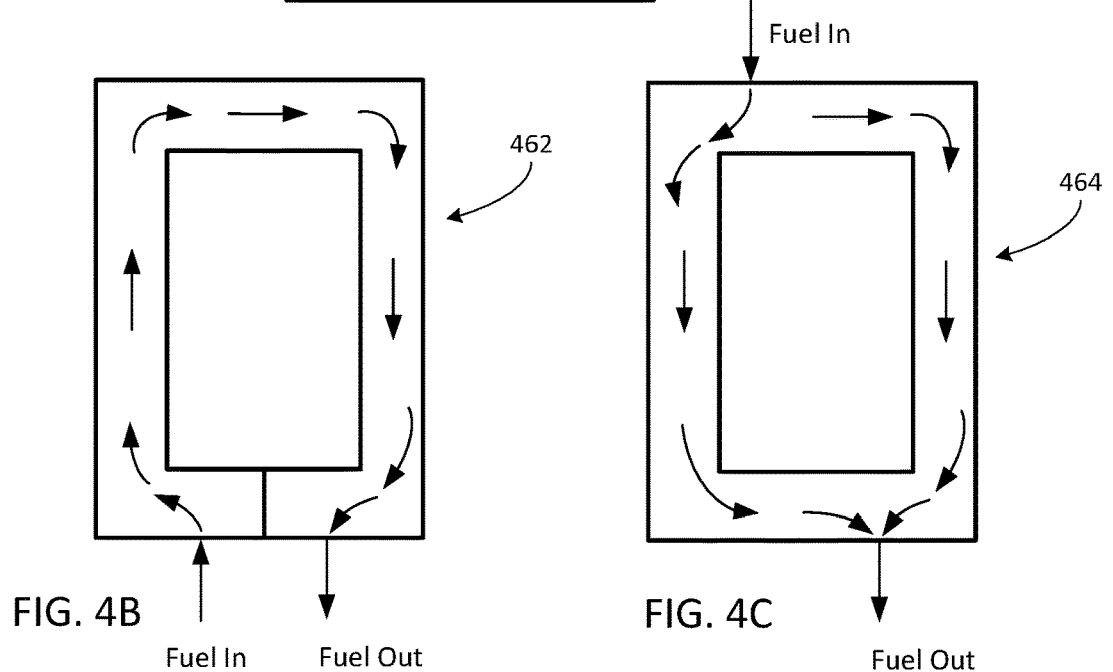
FIG. 4B
FIG. 4C
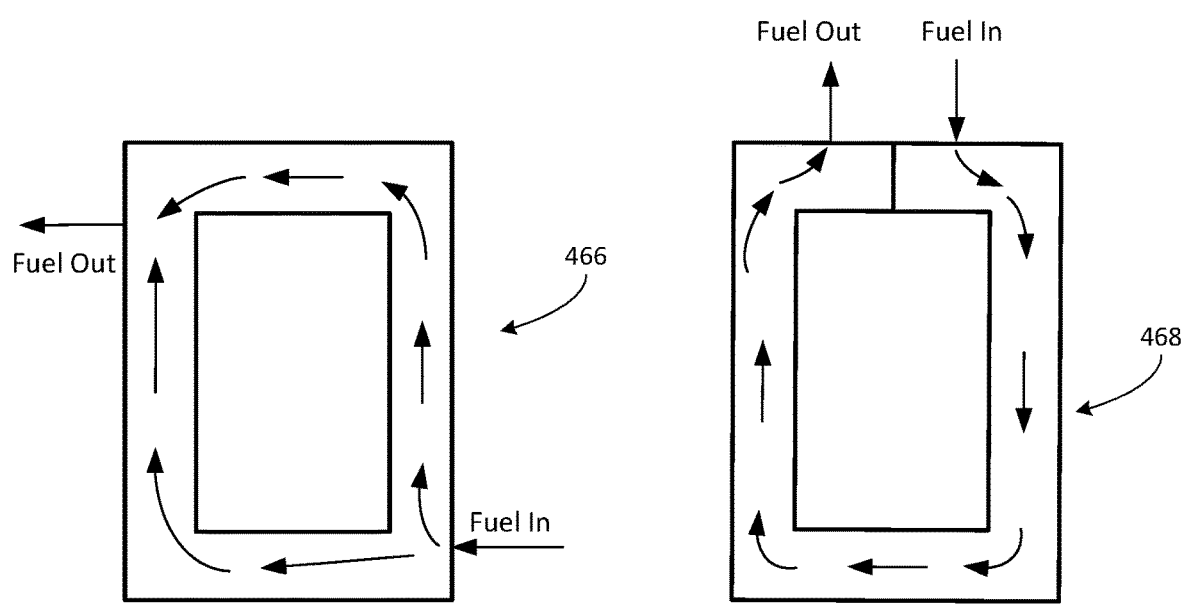
FIG. 4D
FIG. 4E

FIG. 5
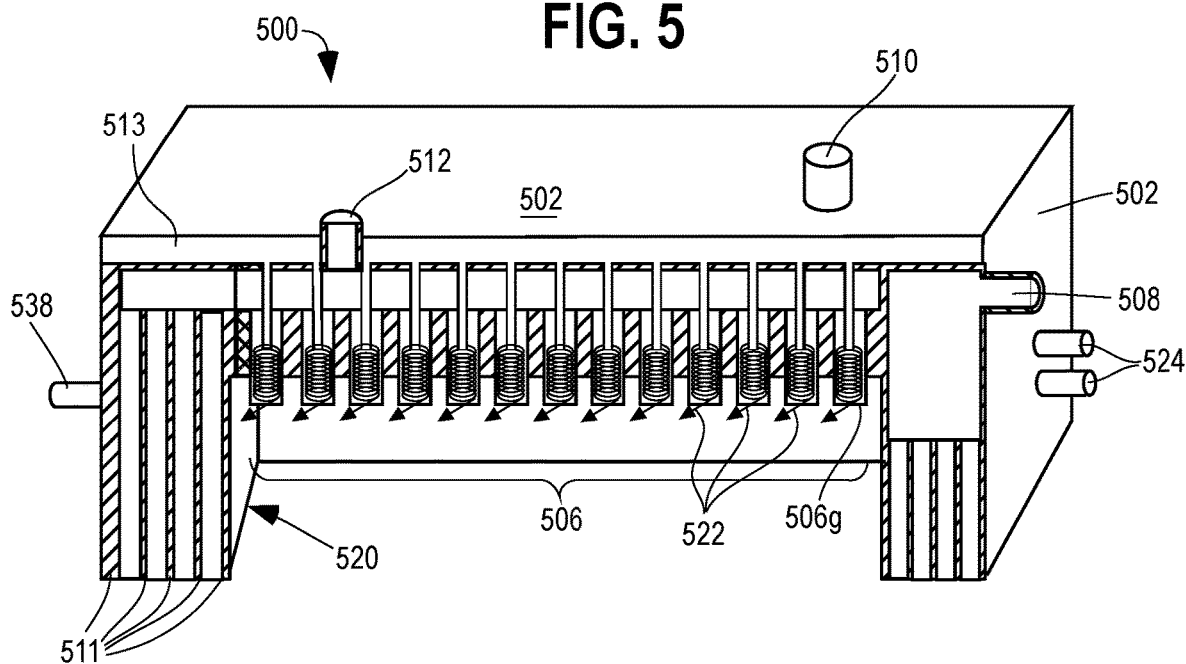
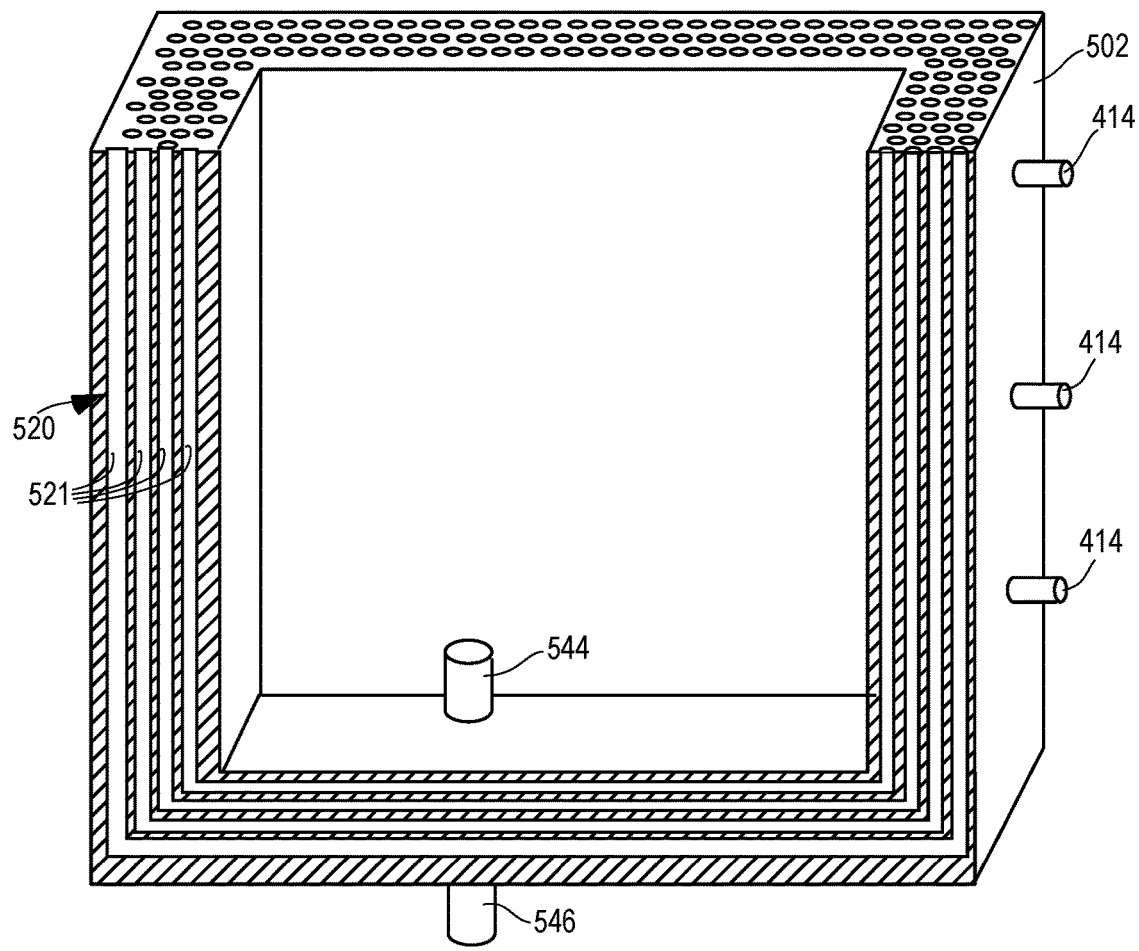

MULTI-FUNCTION OIL TANK

FIELD OF DISCLOSURE

The present invention relates to oil tank and oil distributions systems, and more particularly, to storing, cooling and separating air from oil in an oil tank.

BACKGROUND

Oil is a well-known lubricant used in many different mechanical devices. Many such devices, such as for example, combustion engines and gas turbine engines, operate in environments subject to extreme heat and other harsh factors. Some environments, such as gas turbine engines, are subject to weight limitations for the components used in the engine.

Typical oil distribution systems involve an oil tank for storing the oil, an oil pump, a lubrication target (such as, for example, a gas turbine engine), an oil cooling mechanism, and an air and oil separation mechanism. Oil distribution systems for lubrication in gas engines are subject to both extreme heat and weight limitations. There may also be space limitations. In the description below, the lubrication target is assumed to be a gas turbine engine, but may be any other mechanical device with similar needs. The oil stored in the oil tank is delivered to the gas turbine engine by the oil pump. In a gas turbine engine, like in many other types of mechanical devices, the oil lubricates moving parts. The process of lubrication generates heat, but the location of the mechanical parts may add to the heat generated. For example, the combustion section and the turbine section in a gas turbine engine can become extremely hot. Even if the oil tank can be positioned away from these sections, the oil received from the mechanical parts being lubricated can still be extremely hot.

The weight and space limitations imposed on gas turbine engines used on aircraft are rather obvious. The more weight on the aircraft, the less efficient its operation. Space is also at a premium. To address weight limitations, oil distribution systems have been designed to include oil tanks made of composite materials instead of metal. Composite materials are, however, sensitive to extreme heat raising a risk of damage to the oil tanks. The use of composite materials for constructing oil tanks may require additional cooling measures in order to avoid that thermal damage; those measures would add components and thereby weight while occupying additional space. The additional cooling measures may reduce advantages gained regarding weight and space by using composite materials.

SUMMARY

In view of the above, an oil distribution system includes a system container having an oil reservoir disposed in the system container for storing oil. A heat exchanger is also disposed in the system container and includes at least one oil conduit disposed in the system container, a coolant inlet to receive coolant fluid into the system container and configured to surround the oil tank reservoir and the oil conduit, and a coolant outlet for warmed coolant fluid to exit the system container. The oil distribution system includes an air and oil separation unit disposed in the system container. The air and oil separation unit is configured to receive aerated oil, to separate the oil from the air, and to feed de-aerated oil into the oil reservoir.

In one aspect, an example oil distribution system may be implemented as an oil storage container that contains the oil reservoir, the heat exchanger, and the air/oil separation unit such that the air/oil separation unit receives hot aerated oil from a lubrication target, such as for example, a gas turbine engine, and deposits hot de-aerated oil into the oil reservoir. The oil reservoir transfers the hot aerated oil into oil conduits in the heat exchanger. The heat exchanger receives a coolant fuel to surround the oil conduits creating the heat transfer that cools the oil and warms the fuel. The cooled oil exits the oil conduits at a system oil outlet to provide lubrication to a lubrication target. The warmed fuel exits the heat exchanger to be used to power the gas turbine engine.

In another aspect, an example oil distribution system may be implemented as an oil storage container that contains the oil reservoir, the heat exchanger, and the air/oil separation unit such that the hot aerated oil is received from lubrication targets, such as a gas turbine engine, and deposited into the oil conduits in the heat exchanger and transferred to the air/oil separation unit as cooled aerated oil. The air/separation unit separates the air from the oil and deposits the cooled de-aerated oil into the oil reservoir. The cooled de-aerated oil is transferred to an oil system outlet via an oil outlet from the oil reservoir to provide lubrication for the lubrication targets.

BRIEF DESCRIPTION OF THE DRAWINGS

FIG. 3 is a schematic drawing of another example of an oil distribution system that uses a multi-function oil storage container.

FIG. 4 is a cross-sectional cutout view of an example implementation of the multi-function oil storage container in FIG. 2.

FIG. 4A is a cross sectional view of a base portion of the system container in FIG. 4.

FIGS. 4B-4E are schematic diagrams illustrating alternative flow patterns for a heat exchanger.

FIG. 5 is a cross-sectional cutout view of an example implementation of the multi-function oil storage container in FIG. 3.

DETAILED DESCRIPTION

As used in the description below, the terms "system container" and "oil storage container" shall be used interchangeably as a container that integrates the functions of oil storage, air/oil separation, and heat exchange to provide fireproofing.

Figure 1:
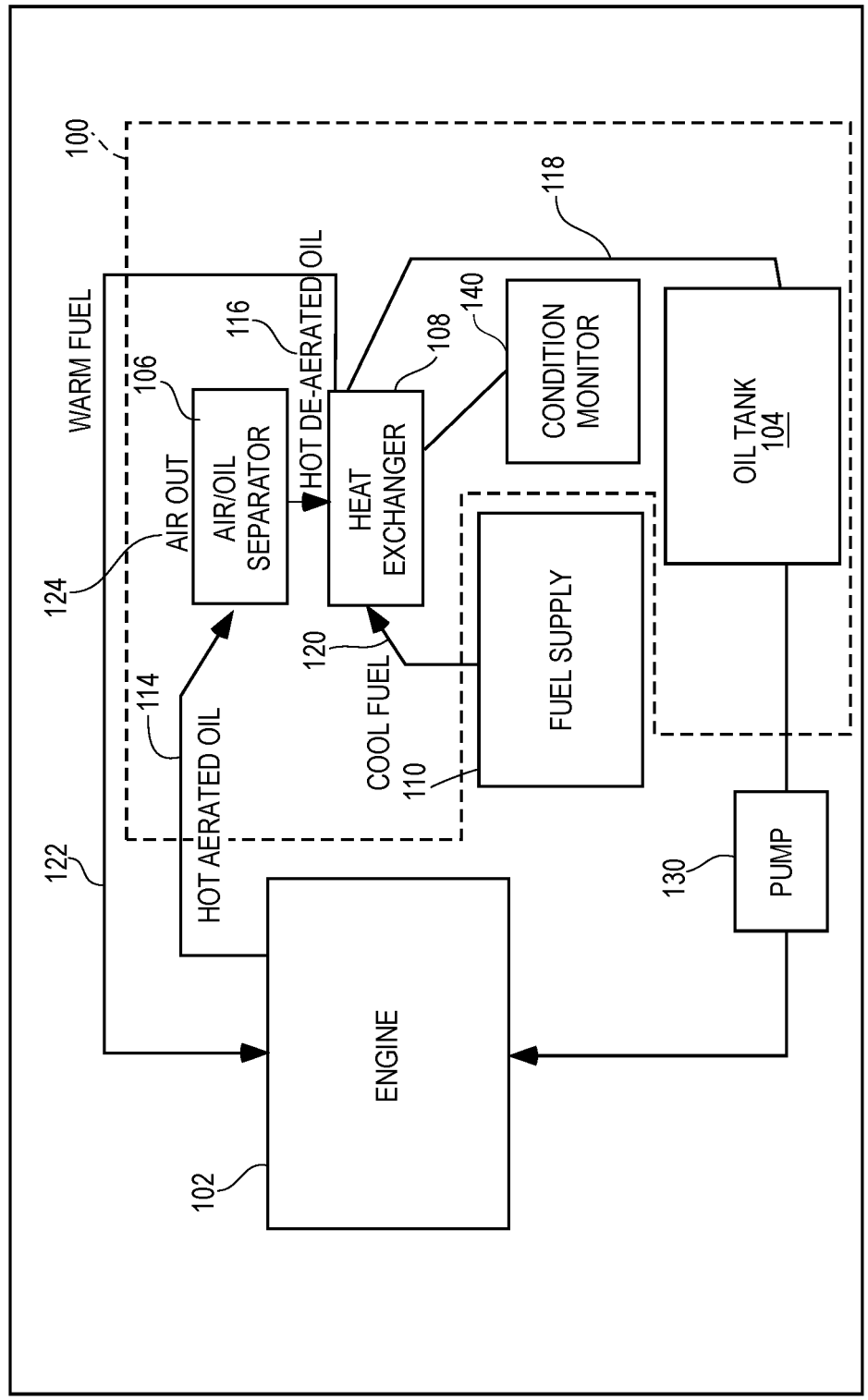
FIG. 1 is a schematic diagram of an oil distribution system for providing oil to an engine.

FIG. 1 is a schematic diagram of an example functionally integrated oil distribution system 100 for providing oil to an engine 102. The oil distribution system 100 integrates the functions of separating air and oil, cooling the oil, and storing the oil, and advantageously provides the function of warming the engine fuel. The oil distribution system 100 includes an oil tank 104, an air/oil separator 106, a heat exchanger 108, a fuel supply 110, and an oil pump 130. The oil tank 104 stores oil, which is delivered to the engine 102 by the oil pump 130. The engine 102 is lubricated by the oil, which is then delivered to the air/oil separator 106. During the operation of the engine 102, the oil is agitated and exposed to air within various chambers in the engine 102 causing the oil to foam up as a mixture of oil and air, or aerated oil. The aerated oil is also hot from having lubricated the components in the engine 102 and is therefore hot aerated oil 114. The air/oil separator 106 removes the air from the air/oil mixture and delivers hot de-aerated oil 116 to the heat exchanger 108.

In the example shown in FIG. 1, the heat exchanger 208 uses fuel as a coolant to cool the hot de-aerated oil 116 and deliver cool de-aerated oil 118 to the oil tank 104. The fuel supply 110 stores cool fuel 120, which is delivered to the heat exchanger 108 to cool the hot de-aerated oil 116. The fuel exits the heat exchanger as warmed fuel 122 and is fed to the engine 102 as fuel. The fuel is advantageously warmed by using it as a coolant for the oil allowing the engine to burn the fuel more efficiently. However, alternative embodiments include configurations where the warmed fuel 122 may be returned to the fuel supply 110 or a separate warmed fuel reservoir (not shown).

The oil distribution system 100 in FIG. 1 may also include a condition monitor 140, which may include functions for monitoring system characteristics or parameters. Such parameters may include, for example, temperature (i.e. of oil and/or fuel), or a level of oil in the oil tank 104, or the flow of the oil and/or fuel. Other parameters may be monitored as well.

Figure 2:
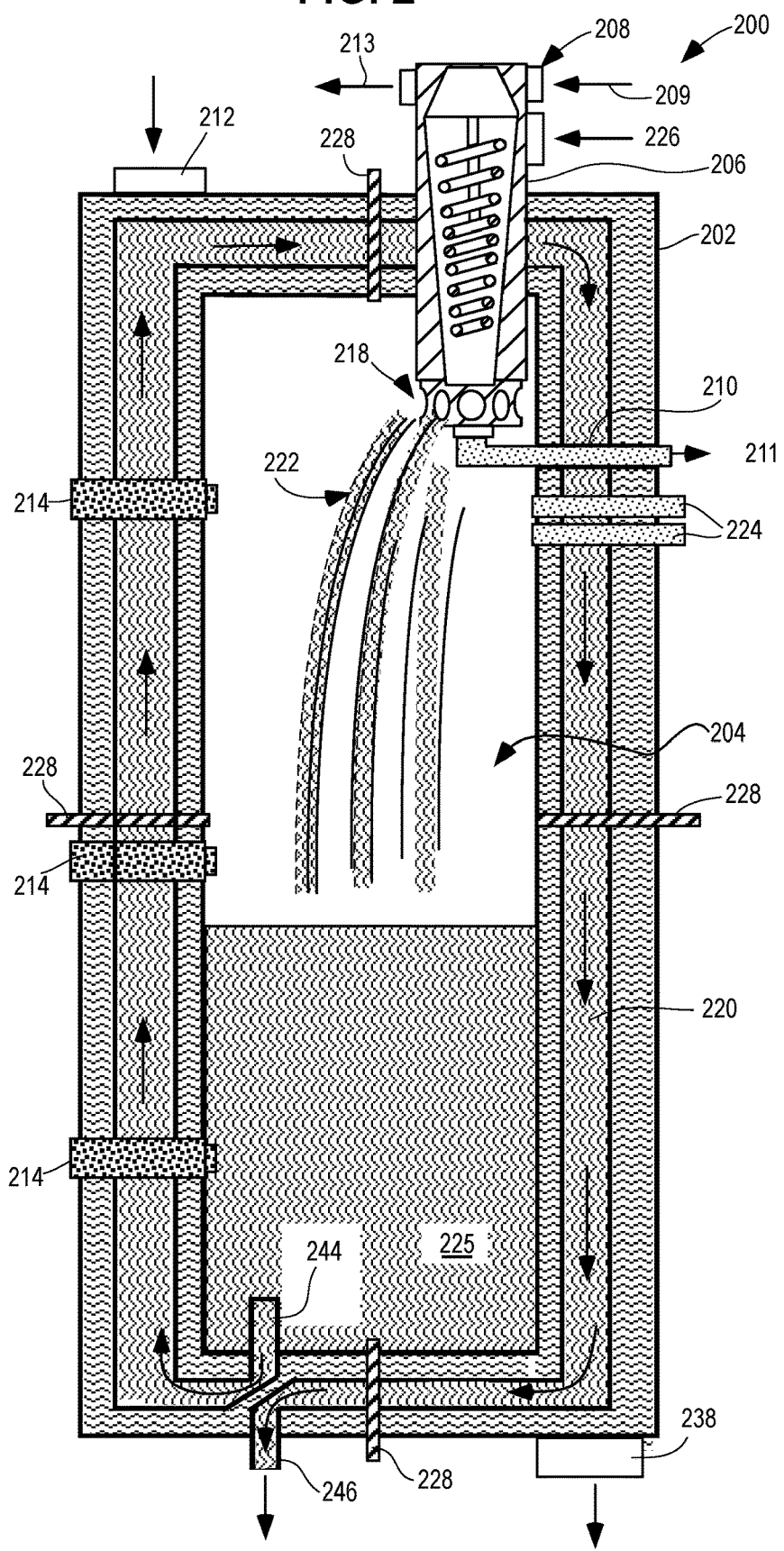
FIG. 2 is a schematic drawing of an example of an oil distribution system that uses a multi-function oil storage container.

The functionally integrated oil distribution system 100 in FIG. 1 is implemented to include the air/gas separator 106, the heat exchanger 108, and the oil tank 104 in the same physical container as indicated by the broken line surrounding the components. The multi-function oil distribution system 100 may be implemented in different ways. FIGS. 2 and 3 are two example implementations illustrated schematically in which the oil distribution system uses a multi-function oil storage container to contain the components for oil storage, oil cooling, and air/oil separation.

FIG. 2 is a schematic drawing of an example of an oil distribution system 200 comprising a multi-function oil storage container 202. The oil storage container 202 contains an oil reservoir 204, an air/oil separation unit 206 connected to the system container 202, and a heat exchanger 220. The oil reservoir 204, air/oil separation unit 206, and heat exchanger 220 are all contained in the system or oil storage container 202.

The air/oil separation unit 206 includes an oil entry port 208, which receives hot aerated oil 114 from the engine (102 in FIG. 1). The air/oil separation unit 206 separates air from the hot oil and deposits hot de-aerated oil 116 at an oil port 218 into the oil reservoir 204. The hot de-aerated oil 116 pools at 225 and is deposited into the heat exchanger 220 at an oil outlet 244.

The heat exchanger 220 may be implemented using any suitable heat exchange structure that allows the oil to flow through the heat exchanger 220 and to exchange heat with coolant fluid. The coolant fluid in the example in FIG. 2 is fuel that enters a coolant inlet 212 from a fuel supply into the space surrounding the heat exchanger 220. The heat exchanger 220 may be implemented as a conduit, such as a tube, or a plurality of tubes that receive the hot de-aerated oil from the oil reservoir 204. The hot de-aerated oil flows through the tubes while the fuel surrounding the tubes cools the oil.

The fuel enters the coolant inlet 212 as cold fuel and advantageously exits at a coolant outlet 238 as warmed fuel ready for use by the engine 102 (FIG. 1). Fuel is typically warmed before use by the engine 102 for fuel efficiency. In the implementation shown in FIG. 2, the warming of the fuel is accomplished in conjunction with the cooling of the oil.

The de-aerated oil flows in the conduit(s) of the heat exchanger 220 around the oil reservoir 204 while the fuel in the heat exchanger cools the oil in the conduits and the oil in the reservoir 204. The oil exits the heat exchanger 220 as cooled de-aerated oil at a system oil output port 246 and delivered to the engine 102 (in FIG. 1) through the operation of the oil pump 130.

The oil reservoir 204 may be made of any suitable material. In an example implementation, a composite material is used and bonded to the oil storage (or system) container 202. The system container 202 may also be made of a composite material, or a light metal, such as aluminum, for example.

Portions of the oil storage (or system) container 202 may be manufactured together with portions of the oil reservoir 204 in sections that are attached using any suitable attachment mechanism (such as for example, welding, adhesives, etc.) as indicated by a plurality of seams 228 surrounding the system container 202.

The oil storage container 202 may also include level sensors 214 disposed in a wall of the system container to detect the level of the oil in the oil reservoir 204. The example in FIG. 2 shows three sensors 214 to provide an indication of a minimum oil level, a normal oil level, and a full oil level. The system container 202 also includes oil fill-to-spill ports 224 to prevent over-filling the oil reservoir 204.

The air/oil separation unit 206 in FIG. 2 is a cyclonic air/oil separator, which creates a cyclonic motion of the aerated oil by introducing the aerated oil tangentially at air/oil input 226, for example. The downward cyclonic motion of the air/oil mixture causes oil droplets to separate from the air as the oil droplets hit the conical wall of the air/oil separator unit 206. A pressurized oil input 209 may be provided to allow an oil film to form in the air/oil separator unit 206 to increase the efficiency of the separation. A pressurized oil output 213 allows oil unused in forming the film to exit. The de-aerated oil exits at the exit port 218 and the separated air 211 is vented through air vent 210 into the surroundings of the oil storage container 202. The air/oil separation unit 206 shown in FIG. 2 is a cyclonic separator, but may be any suitable air/oil separator.

The oil conduit or conduits in the heat exchanger 220 may be a tube, or tubes, as described above, but may also include other heat exchange structures. For example, fins may be added to outer walls and/or inner walls of the oil conduits. The conduits may also be arranged so that the hot de-aerated oil flows in the same direction as the coolant fuel forming a cross-flow heat exchanger 220. The hot oil and cool fuel exchange heat and exit the system with less of a difference in temperature.

FIG. 3 is a schematic drawing of another example of an oil distribution system 300 that uses a multi-function oil storage container 302. The oil storage container 302 contains an oil reservoir 304, an air/oil separation unit 306, and a heat exchanger 320. The oil reservoir 304, air/oil separation unit 306, and heat exchanger 320 are all contained in the system or oil storage container 302.

The air/oil separation unit 306 includes a plurality of air/oil separation chambers 306a-g. The air/oil separation unit 306 receives cooled aerated oil from the heat exchanger 320, separates the air and oil, deposits cooled de-aerated oil 322 into the oil reservoir 304, and vents the air from air/oil mix at air vent 310. Each air/oil separation chamber 306a-g may be a cyclonic air/oil separator or a suitable alternative.

The heat exchanger 320 may be implemented using any suitable heat exchange structure that allows the oil to flow through the heat exchanger 320 to exchange heat with coolant in a space surrounding the heat exchanger 320 and the oil reservoir 304. The coolant in the example in FIG. 3 is fuel that enters a coolant inlet 312 from a fuel supply into the space surrounding the heat exchanger 320. The heat exchanger 320 may a conduit, such as a tube, or a plurality of tubes that receive the hot aerated oil from an oil entry port 308. The hot aerated oil flows through the tubes while the fuel surrounding the tubes cools the oil.

The fuel enters the coolant inlet 312 as cold fuel and advantageously exits at a coolant outlet 338 as warmed fuel ready for use by the engine 102 (FIG. 1). Fuel is typically warmed before use by the engine 102 for fuel efficiency. In the implementation shown in FIG. 3, the warming of the fuel is accomplished in conjunction with the cooling of the oil.

The aerated oil flows in the conduit(s) of the heat exchanger 320 around the oil reservoir 304 while the fuel in the heat exchanger 320 cools the oil in the conduits and the oil in the reservoir 304. The oil exits the heat exchanger 320 as cooled aerated oil at the air/oil separation chambers 306*a-g*, which deposits cooled de-aerated oil into the oil reservoir 304 as described above. An oil reservoir oil outlet 344 connects to a system oil output port 346 to deliver cooled de-aerated oil to the engine 102 (in FIG. 1) through the operation of the oil pump 130.

The oil reservoir 304 may be made of any suitable material as described above with reference to the example in FIG. 2. In an example implementation, a composite material is used and bonded to the oil storage (or system) container 302. The system container 302 may be made of a composite material due to the active cooling of the oil container, or a light metal, such as aluminum, for example.

Portions of the oil storage (or system) container 302 may be manufactured together with portions of the oil reservoir 304 in sections that are attached using any suitable attachment mechanism (such as for example, welding, adhesives, etc.). The sectioning of the oil storage container and oil reservoir is indicated by a plurality of seams 228 surrounding the system container 302.

The oil storage container 302 may also include level sensors 214 to detect the level of the oil in the oil reservoir 304 as described above with reference to FIG. 2. The system container 302 also includes oil fill-to-spill ports 324 to prevent over-filling the oil reservoir 304.

The oil conduit or conduits in the heat exchanger 320 may be a tubular heat exchanger as described above, but may also include other heat exchange structures. For example, a fin style heat exchanger may include fins added to outer walls and/or inner walls of the oil conduits. The conduits may also be arranged so that the hot de-aerated oil flows in the same direction as the coolant fuel forming a cross-flow heat exchanger 320. The hot oil and cool fuel exchange heat and exit the system with less of a difference in temperature. The heat exchanger may also be a parallel heat exchanger or any other suitable type.

FIG. 4 is a cross-sectional cutout view of an example implementation of the multi-function oil storage container in FIG. 2. The oil distribution system 400 in FIG. 4 includes an oil storage container 402, an oil reservoir 404, an air/oil separation unit 406, and a heat exchanger 420. The oil reservoir 404, air/oil separation unit 406, and heat exchanger 420 are all contained in the oil storage container (or system container) 402.

The air/oil separation unit 406 includes a hot aerated oil input 408 and an oil entry port 407 to deposit hot de-aerated oil into the oil reservoir 404. The hot de-aerated oil flows into an oil outlet 444 shown in FIG. 4 at a bottom surface of the oil reservoir 404. The oil outlet 444 delivers hot de-aerated oil into an oil input manifold 433, which fluidly connects to a plurality of oil conduits 421 in the heat exchanger 420. The plurality of oil conduits 421 are implemented in the example in FIG. 4 as a plurality of tubes allowing oil to flow outward in the oil input manifold 433 in the bottom end of the system container 402 and upward around sidewalls of the oil reservoir 404 on a heat exchanger input side 430 of the heat exchanger 420. The oil flows downward around sidewalls of the oil reservoir 404 into an oil output manifold 435 on a heat exchanger output side 440 of the heat exchanger 420. The plurality of oil conduits 421 are disposed in the heat exchanger 220 so as to surround the oil reservoir 404.

The oil input manifold 433 and the oil output manifold 435 are fluidly separated at the bottom end of the heat exchanger 420 by a coolant cavity separator 450. The coolant fuel enters the heat exchanger on the input side 430 at a coolant inlet 412. The coolant cavity separator 450 creates an upward flow of fuel along the left side wall of the oil reservoir 404 and a downward flow on the right side wall of the oil reservoir to a fuel outlet 438. The heat exchanger 420 in FIG. 4 allows the coolant fuel to flow in the same direction as the oil flowing in the tubes 421 providing a cross-flow heat exchange between oil and fuel. The coolant fuel cools the oil in the oil conduits by surrounding the conduits at 411 for example. The coolant fuel also cools the oil in the oil reservoir by contact with the outer wall of the oil reservoir 404.

FIG. 4A is a cross-sectional view of a bottom end of the system container 402 illustrating the oil input manifold 433 and oil output manifold 435 separated by the coolant cavity separator 450. The oil enters and fills the oil input manifold 433 via oil outlet 444 from the oil reservoir 404 (in FIG. 4). The oil enters oil conduits 421*a* to flow upward as shown in FIG. 4. The oil conduits 421*a* on the input side connect at a top side of the heat exchanger 420 to oil conduits 421*b*. The oil flows downward in the oil conduits 421*b* and into the oil output manifold 435 before exiting through the system output port 446. The fuel output 438 is formed in the bottom of the system container 402 beneath the oil output manifold 435 as shown in FIG. 4.

It is noted that the coolant fuel enters the heat exchanger 420 in the examples in FIGS. 4 and 4A under the system container 402 to allow the coolant fuel to flow 360° around the oil reservoir 404. This pattern is illustrated in FIG. 4B, which depicts the system 462 with the heat exchanger surrounding the oil reservoir to provide a desired cross-flow heat exchange. Other patterns of heat exchange are possible by configuring the heat exchanger to provide a coolant flow in a desired direction relative to the oil flow. FIG. 4C illustrates a flow pattern in which the coolant enters a top side of the system 464 and flow downward on all sides of the oil reservoir to a fuel output at the bottom of the system 464. FIG. 4D illustrates a system 466 in which coolant fuel enters a side of the system 466 to surround the oil reservoir and flow out of the system 466 on an opposite side. FIG. 4E illustrates an example system 468 having an oil flow pattern similar to that of FIG. 4B, except the fuel input and fuel output ports are on a top side of the system 468.

The oil conduits may be disposed to enable contact by the coolant fuel to at least a portion of the surface of any of the conduits. The oil conduits may be configured to extend in the system in any desired direction to provide a desired heat exchange. The flow of both the oil and the coolant fuel may be controlled by pumps disposed upstream or downstream of the system.

The oil storage container 402 in FIG. 4 also includes oil level sensor 414 extending in through the heat exchanger 420 and into the oil reservoir 404 to detect an oil level in the oil reservoir 404. In addition, oil fill-to-spill ports 424 are provided to prevent over fill of the oil reservoir 404. The oil fill-to-spill ports 424 may be mounted at a distance from a bottom of the oil reservoir indicative of a maximum oil fill.

FIG. 5 is a cross-sectional cutout view of an example implementation of the multi-function oil storage container in FIG. 3. The oil distribution system 500 in FIG. 5 includes an oil storage container 502, an oil reservoir 504, an air/oil separation unit 506, and a heat exchanger 520. The oil reservoir 504, air/oil separation unit 506, and heat exchanger 520 are all contained in the oil storage container (or system container) 502.

The air/oil separation unit 506 includes a plurality of air/oil separation chambers 506a-g as described above with reference to FIG. 3. The air/oil separation unit 506 receives cooled aerated oil from oil conduits 521 in the heat exchanger 520, separates the air and oil, and deposits cooled de-aerated oil 522 into the oil reservoir 504. An air chamber 513 receives separated air from the air/oil separation chambers 506a-g and vents the air at air vent 510. Each air/oil separation chamber 506a-g may be a cyclonic air/oil separator or a suitable alternative.

Hot aerated oil enters the system at oil entry input 508 directly into the plurality of oil conduits 521 in the heat exchanger 520. The hot de-aerated oil flows in the plurality of oil conduits 521, which are surrounded by coolant fuel (at 511) causing a heat transfer between the cool fuel and the hot oil. The aerated oil flows in the oil conduits 521 towards a top side of the system container 502 where the now cooled aerated oil is transferred to the air/oil separation chambers 506a-g. Cooled and de-aerated oil is deposited from the air/oil separation chambers 506a-g into the oil reservoir 504 where it is stored. Oil level sensors 414 are disposed through a side of the system container 502 to monitor the amount of oil in the oil reservoir 504. In addition, spill ports 524 are provided to prevent over fill of the oil reservoir 504.

The coolant fuel enters the heat exchanger 520 at a coolant inlet 512 and flows in the oil reservoir 504 to a fuel outlet 538. The coolant fuel cools the oil in the oil conduits 521 by surrounding the conduits at 511 for example. The coolant fuel also cools the oil in the oil reservoir 504 by contact with the outer wall of the oil reservoir 504.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. An oil distribution system comprising:
   a system container comprising a top wall, a bottom wall, and side walls;
   an oil reservoir disposed in the system container for storing oil;
   a heat exchanger disposed in the system container, the heat exchanger comprising:
      at least one oil conduit disposed in the system container substantially along the top wall, the bottom wall, the side walls, and around the oil reservoir,
      a coolant inlet to receive coolant fluid into the system container, wherein the coolant fluid surrounds the oil reservoir and surrounds a surface of the at least one oil conduit, and
      a coolant outlet for warmed coolant fluid to exit the system container; and
   an air and oil separation unit connected to the system container, the air and oil separation unit configured to receive aerated oil, to separate the oil from the air, and to feed de-aerated oil into the oil reservoir.

2. The oil distribution system of claim 1 wherein the oil reservoir is made of a composite material and is bonded to the system container.

3. The oil distribution system of claim 2 wherein the system container is made of metal.

4. The oil distribution system of claim 1 wherein the heat exchanger comprises any of a tubular heat exchanger, a tubular heat exchanger comprising a plurality of tubes, a fin style heat exchanger, a parallel flow heat exchanger, and a cross-flow heat exchanger.

5. The oil distribution system of claim 1 further comprising a plurality of oil level sensors disposed in the side walls of the system container and extending into a wall of the oil reservoir.

6. The oil distribution system of claim 1 further comprising an oil fill-to-spill port mounted on the side walls of the system container and extending into a wall of the oil reservoir at a distance from a bottom of the oil reservoir indicative of a maximum oil fill.

7. The oil distribution system of claim 1 wherein the air and oil separation unit is a cyclonic air/oil separator.

8. The oil distribution system of claim 1 further comprising: an oil entry port configured to receive hot aerated oil to the air and oil separation unit and deposit hot de-aerated oil into the oil reservoir.

9. The oil distribution system of claim 8 wherein:
   the system container comprises a coolant cavity separator disposed between an outer surface of a bottom of the oil reservoir and an inner surface of a bottom of the system container to separate the bottom of the system container into a heat exchanger input side and a heat exchanger output side; and
   the oil reservoir comprises an oil outlet configured to transfer oil from the oil reservoir to the oil conduit in the heat exchanger input side of the heat exchanger.

10. The oil distribution system of claim 9 wherein:
   the system container comprises a system oil output port on the heat exchanger output side to receive cooled de-aerated oil from the oil conduit for distribution to components for lubrication.

11. The oil distribution system of claim 1 wherein:
   an oil entry port is mounted on a side of the system container to allow hot aerated oil to enter the oil conduit in the heat exchanger.

12. The oil distribution system of claim 11 wherein:
the air and oil separation unit comprises a plurality of air and oil separation chambers disposed above a top surface of the oil reservoir in the system container.

13. The oil distribution system of claim 12 wherein:
the oil conduit is configured to feed cooled aerated oil from the heat exchanger to the air and oil separation chambers, each air and oil separation chamber comprising a reservoir entry port into the oil reservoir to feed the oil reservoir with the cool de-aerated oil.

14. The oil distribution system of claim 13 wherein the coolant inlet is mounted to feed coolant into a top space in the system container between a top side of the system container and a top side of the oil reservoir.

15. The oil distribution system of claim 14 wherein the coolant outlet is mounted in the top wall of the system container.

16. The oil distribution system of claim 15 wherein the oil reservoir comprises an oil outlet configured to transfer cool de-aerated oil from the oil reservoir into a system oil output port to receive cooled de-aerated oil from the oil conduit for distribution to components for lubrication.

17. An oil storage container comprising:
a top wall; a bottom wall, and side walls;
an oil reservoir disposed in the oil storage container;
an oil entry port configured to receive hot aerated oil to the oil storage container;
an air and oil separation unit configured to receive hot aerated oil from the oil entry port and deposit hot de-aerated oil into the oil reservoir, to separate oil from the air, and to feed hot de-aerated oil into the oil reservoir;
a heat exchanger disposed in the oil storage container, the heat exchanger comprising:
an oil conduit disposed in the oil storage container substantially along the top wall, the bottom wall, the side walls, and around the oil reservoir,
a coolant inlet to receive coolant fluid into the oil storage container to surround the oil reservoir and the oil conduit, and
a coolant outlet for warmed coolant fluid to exit the oil storage container; and
a container oil output port to receive cooled de-aerated oil from the oil conduit for distribution to components for lubrication.

18. The oil storage container of claim 17 wherein:
the coolant fluid is fuel for an engine; and
the oil reservoir is made of a composite material bonded to the oil storage container.

19. An oil storage container comprising:
a top wall; a bottom wall, and side walls;
an oil reservoir disposed inside the oil storage container;
an oil entry port mounted on the oil storage container to receive hot aerated oil into the oil storage container;
a plurality of air and oil separation chambers disposed above a top surface of the oil reservoir in the oil storage container to separate oil and air and deposit cool de-aerated oil into the oil reservoir;
a heat exchanger disposed in the oil storage container, the heat exchanger comprising:
an oil conduit disposed in the oil storage container substantially along the top wall, the bottom wall, the side walls, and around the oil reservoir and connected to the oil entry port to receive the hot aerated oil,
a coolant inlet to receive coolant fluid into the oil storage container to surround the oil reservoir and the oil conduit, and
a coolant outlet for warmed coolant fluid to exit the oil storage container; and
a container oil output port to receive cooled de-aerated oil from the oil reservoir for distribution to components for lubrication;
wherein the oil conduit surrounds the oil reservoir in a space between the oil reservoir and an inner surface of the oil storage container and connects to the plurality of air and oil separation chambers to deliver cooled aerated oil to the air and oil separation chambers.

20. The oil storage container of claim 19 wherein:
the coolant fluid is fuel for an engine; and
the oil reservoir is made of a composite material bonded to the oil storage container.

* * * * *